US009322325B2

(12) United States Patent
Mori et al.

(10) Patent No.: US 9,322,325 B2
(45) Date of Patent: Apr. 26, 2016

(54) VARIABLE NOZZLE CONTROL DEVICE AND VARIABLE GEOMETRY TURBOCHARGER (71) Applicant: KABUSHIKI KAISHA TOYOTA JIDOSHOKKI, Kariya-shi, Aichi (JP)

(72) Inventors: Masayoshi Mori, Kariya (JP); Yuji Narita, Kariya (JP)

(73) Assignee: KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 508 days.

(21) Appl. No.: 13/946,127

(22) Filed: Jul. 19, 2013

(65) Prior Publication Data

US 2014/0023488 A1 Jan. 23, 2014

(30) Foreign Application Priority Data

Jul. 20, 2012 (JP) ................. 2012-161706

(51) Int. Cl.
*F02B 37/24* (2006.01)
*F01D 17/16* (2006.01)

(52) U.S. Cl.
CPC ............. *F02B 37/24* (2013.01); *F01D 17/165* (2013.01); *F01D 17/167* (2013.01); *F05D 2250/90* (2013.01); *Y02T 10/144* (2013.01)

(58) Field of Classification Search
CPC . F01D 17/165; F01D 17/167; F05D 2250/90; F02B 37/24
See application file for complete search history.

(56) References Cited

U.S. PATENT DOCUMENTS

| 8,683,799 B2 * | 4/2014 | Azuma | F02B 37/24 60/602 |
| 2009/0123272 A1 * | 5/2009 | Love | F01D 17/165 415/148 |
| 2012/0121392 A1 | 5/2012 | Azuma | |

FOREIGN PATENT DOCUMENTS

| EP | 1304462 A2 | 4/2003 | |
| EP | 2474724 A1 * | 7/2012 | ............. F02B 37/24 |
| JP | 2002-004869 A | 1/2002 | |
| JP | 2003-138971 A | 5/2003 | |
| JP | 2003-227343 A | 8/2003 | |
| JP | 2003-227362 A | 8/2003 | |
| JP | 2004-183582 A | 7/2004 | |
| JP | 2009-180110 A | 8/2009 | |
| JP | 2009-243449 A | 10/2009 | |
| WO | 2009010711 A1 | 1/2009 | |

OTHER PUBLICATIONS

Partial English Translation of JP 2004-183582A.
European Search Report dated May 26, 2014 from the European Patent Office in counterpart European Patent Application No. 13176998.6.

* cited by examiner

*Primary Examiner* — Ninh H Nguyen
(74) *Attorney, Agent, or Firm* — Sughrue Mion, PLLC

(57) ABSTRACT

A variable nozzle control device is provided with a drive unit, a stopper, and a controller. The drive unit drives variable nozzles. The stopper is configured to be in contact with the drive unit with the variable nozzles being in a full close state. The controller counts a time including an operating time of an engine after preceding contact of the drive unit with the stopper, determines whether the counted time has reached a predetermined time, and controls the drive unit so as to bring the drive unit into contact with the stopper when determining that the counted time has reached the predetermined time, with the engine at a stop.

10 Claims, 6 Drawing Sheets

VARIABLE NOZZLE CONTROL DEVICE AND VARIABLE GEOMETRY TURBOCHARGER

BACKGROUND OF THE INVENTION

1. Field of the Invention

The present invention relates to a variable nozzle control device and a variable geometry turbocharger with the variable nozzle control device.

2. Related Background Art

For example, the variable geometry turbocharger is commonly adopted in diesel engines. The variable geometry turbocharger has variable nozzles to adjust a flow rate of exhaust gas. An opening of the variable nozzles is controlled by an actuator (e.g., a stepping motor or a DC motor). For accurate control of the opening of the variable nozzles, an important factor is a reference value for the opening of the variable nozzles. In order to eliminate dispersion of the opening of the variable nozzles, there are proposed technologies of learning the reference value for the opening of the variable nozzles. One of such technologies is variable nozzle full close learning. In the variable nozzle full close learning, the reference value is determined to be an opening detection value in a full close state of the variable nozzles with the engine at a stop.

A conventional technique of execution of the variable nozzle full close learning is, for example, the technology described in Japanese Patent Application Laid-open No. 2002-4869. In the technology described in this application, an arm is connected through a unison ring to a plurality of movable vanes (variable nozzles), this arm is moved by a stepping motor, and a position regulating member is provided so as to engage with the arm. In this configuration, the arm is moved by the stepping motor to be brought into contact with the position regulating member and the opening of the movable vanes (in the full close state) at that time is defined as a reference position.

SUMMARY OF THE INVENTION

The technology described in the aforementioned Application has the problem as discussed below. During execution of the variable nozzle full close learning, a drive force of the motor needs to increase in view of deterioration of the variable nozzles themselves or dullness of the variable nozzles, e.g., due to deposition of soot in the exhaust gas on the variable nozzles. When the arm is brought into contact with the position regulating member by a large motor drive force, a significant load is imposed on a variable nozzle drive system including the motor, gears, and so on. For this reason, the components of the variable nozzle drive system become easier to damage, with increase in the number of times of execution of the variable nozzle full close learning.

An object of the present invention is to provide a variable nozzle control device and a variable geometry turbocharger capable of suppressing the damage of the components of the variable nozzle drive system.

An aspect of the present invention is a variable nozzle control device for controlling an opening of a variable nozzle in a variable geometry turbocharger to be mounted on an engine, the variable nozzle control device comprising: nozzle drive means for driving the variable nozzle; a learning stopper for learning of a reference position of the variable nozzle, the learning stopper being configured to be in contact with the nozzle drive means with the variable nozzle being in a full close state; and control means configured to control the nozzle drive means so as to bring the nozzle drive means into contact with the learning stopper, wherein the control means has: first means for counting a learning execution determination time including an operating time of the engine after preceding contact of the nozzle drive means with the learning stopper; second means for determining whether the learning execution determination time has reached a predetermined time; and third means for controlling the nozzle drive means so as to bring the nozzle drive means into contact with the learning stopper when the second means determines that the learning execution determination time has reached the predetermined time, with the engine at a stop.

In the present invention, when the engine is at a stop and when it is determined that the learning execution determination time has reached the predetermined time, the nozzle drive means is controlled to be brought into contact with the learning stopper. The learning execution determination time includes the operating time of the engine after the preceding contact of the nozzle drive means with the learning stopper. Namely, when the engine is at a stop and when it is determined that the learning execution determination time has reached the predetermined time, the present operation of full close learning of the variable nozzle is carried out. Therefore, there is no need for executing the full close learning of the variable nozzle every stop of the engine, which decreases a frequency of execution of the full close learning of the variable nozzle. As a consequence of this, it is feasible to suppress damage of components of the nozzle drive means being the variable nozzle drive system.

The first means may count only the operating time of the engine after the preceding contact of the nozzle drive means with the learning stopper, as the learning execution determination time. In this case, since only the operating time of the engine after the preceding execution of the full close learning of the variable nozzle is counted as the learning execution determination time, the frequency of execution of the full close learning of the variable nozzle further decreases. As a consequence of this, it is feasible to further suppress the damage of the components of the nozzle drive means.

The first means may count a total of the operating time and a stop time of the engine after the preceding contact of the nozzle drive means with the learning stopper, as the learning execution determination time. In this case, since a mere elapsed time after the preceding execution of the full close learning of the variable nozzle is counted as the learning execution determination time, it is feasible to avoid repetitions of counting-up and stop operations with starts and stops of the engine. As a result, it is feasible to simplify the determination process on execution of the full close learning of the variable nozzle.

Another aspect of the present invention is a variable geometry turbocharger which comprises the foregoing variable nozzle control device. This variable geometry turbocharger may be mounted on an engine of an industrial vehicle.

Still another aspect of the present invention is a variable nozzle control device for controlling an opening of a variable nozzle in a variable geometry turbocharger to be mounted on an engine, the variable nozzle control device comprising: a drive unit configured to drive the variable nozzle; a stopper configured to be in contact with the drive unit with the variable nozzle being in a full close state; and a controller configured to count a time including an operating time of the engine after preceding contact of the drive unit with the stopper, to determine whether the time counted has reached a predetermined time, and to control the drive unit so as to bring the drive unit into contact with the stopper when determining that the time counted has reached the predetermined time, with the engine at a stop.

The controller may be configured to count only the operating time of the engine after the preceding contact of the drive unit with the stopper, as the time counted. The controller may be configured to count a total of the operating time and a stop time of the engine after the preceding contact of the drive unit with the stopper, as the time counted.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description, the same elements or elements with the same functionality will be denoted by the same reference signs, without redundant description.

Figure 1:
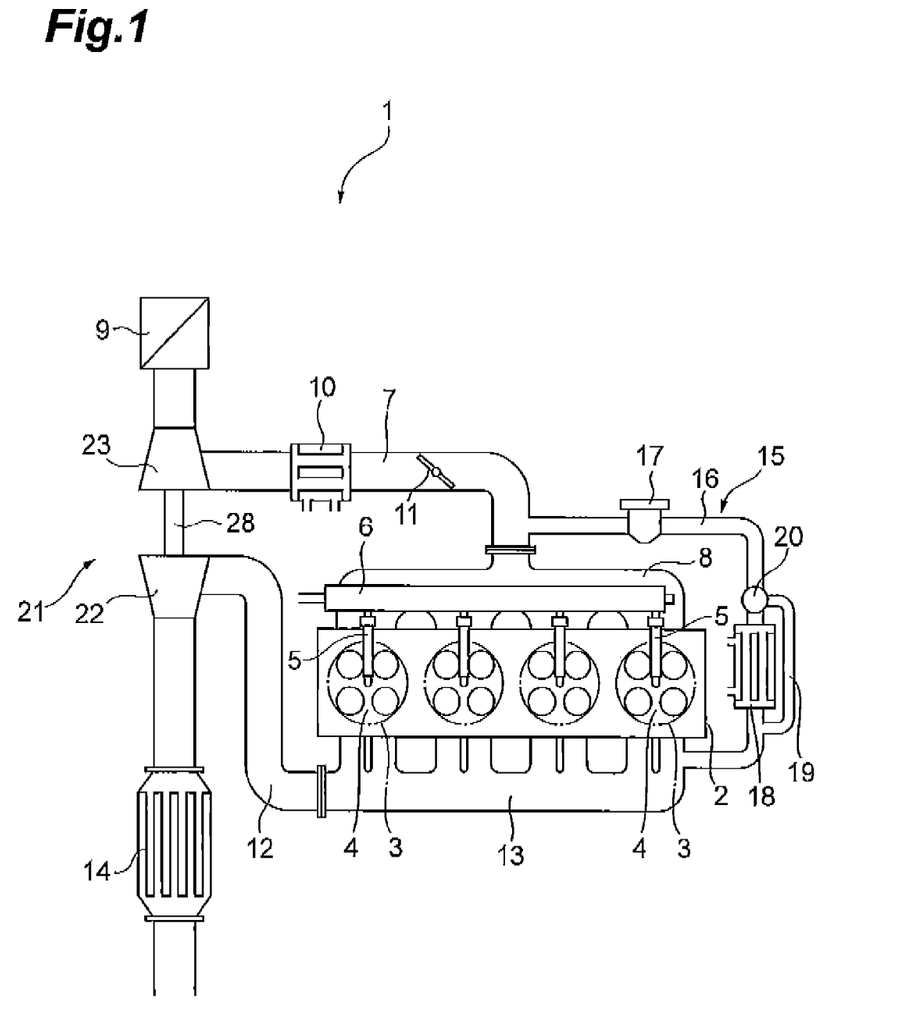
FIG. 1 is a schematic configuration diagram showing a diesel engine with a variable geometry turbocharger according to an embodiment of the present invention.

FIG. 1 is a schematic configuration diagram showing a diesel engine with a variable geometry turbocharger according to an embodiment of the present invention. In FIG. 1, the diesel engine 1 is a four-cylinder in-line diesel engine of a common rail system, which is mounted on a forklift being one of the industrial vehicles.

The diesel engine (which will be referred to hereinafter simply as "engine") 1 is provided with an engine body 2 and four cylinders 3 are arranged in the engine body 2. Each cylinder 3 is equipped with an injector 5 to inject fuel into a combustion chamber 4. Each injector 5 is connected to a common rail 6 and high-pressure fuel accumulated in the common rail 6 is supplied to each injector 5.

An intake passage 7 to take air into the combustion chambers 4 is connected through an intake manifold 8 to the engine body 2. On the intake passage 7 there are an air cleaner 9, an intercooler 10, and a throttle valve 11 arranged from upstream to downstream. An exhaust passage 12 to discharge exhaust gas after combustion is connected through an exhaust manifold 13 to the engine body 2. A DPF-incorporated catalyst 14 is arranged on the exhaust passage 12.

The engine 1 is equipped with an EGR (exhaust gas recirculation) unit 15 to return part of the exhaust gas after combustion, as EGR gas into the combustion chambers 4. The EGR unit 15 has an EGR passage 16, an EGR valve 17, an EGR cooler 18, a bypass line 19, and a changeover valve 20. The EGR passage 16 is arranged so as to connect the intake passage 7 and the exhaust manifold 13 and return the EGR gas. The EGR valve 17 controls a recirculation amount of EGR gas from the exhaust manifold 13 to the intake passage 7. The EGR cooler 18 cools the EGR gas passing through the EGR passage 16. The bypass line 19 is connected to the EGR passage 16 so as to bypass the EGR cooler 18. The changeover valve 20 changes over the flow path of the EGR gas to the EGR cooler 18 side or to the bypass line 19 side.

The engine 1 is provided with the variable geometry turbocharger (which will be referred to hereinafter simply as "turbocharger") 21. Namely, the turbocharger 21 is mounted on the engine 1. The turbocharger 21 has a turbine 22 disposed on the exhaust passage 12 side and a compressor 23 disposed on the intake passage 7 side.

Figure 2:
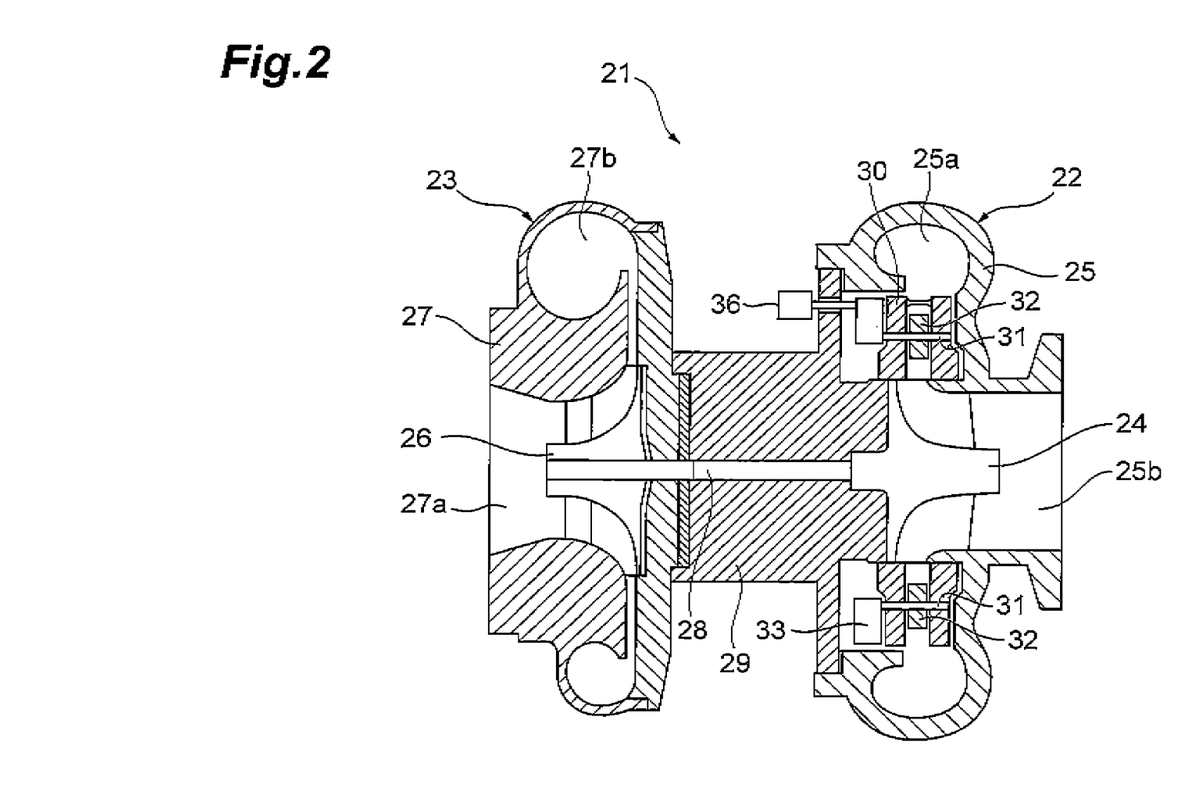
FIG. 2 is a drawing for explaining a sectional configuration of the variable geometry turbocharger shown in FIG. 1.

The turbine 22, as shown in FIG. 2, has a turbine wheel 24, and a turbine housing 25 housing the turbine wheel 24. A scroll passage 25a and an outlet passage 25b in communication with the exhaust passage 12 are formed in the turbine housing 25. The scroll passage 25a is provided for circulating the exhaust gas from the exhaust manifold 13. The outlet passage 25b is located downstream of the scroll passage 25a and is provided for discharging the exhaust gas in the scroll passage 25a through the turbine wheel 24.

The compressor 23 has a compressor impeller 26, and a compressor housing 27 housing the compressor impeller 26. An inlet passage 27a and a delivery passage 27b in communication with the intake passage 7 are formed in the compressor housing 27. The inlet passage 27a is provided for taking in air from the air cleaner 9. The delivery passage 27b is located downstream of the inlet passage 27a and is provided for delivering the intake air compressed by the compressor impeller 26.

The turbine wheel 24 and the compressor impeller 26 are coupled to each other by a turbine shaft 28. The turbine shaft 28 is rotatably supported through bearings (not shown) in an intermediate housing 29.

When the exhaust gas discharged from the combustion chambers 4 is introduced into the turbine 22, the turbine wheel 24 comes to be rotated by energy of the exhaust gas. Then the compressor impeller 26 integrated with the turbine wheel 24 through the turbine shaft 28 comes to rotate. The intake air compressed by the rotation of the compressor impeller 26 is supplied from the compressor 23 to the combustion chambers 4.

Figure 3:
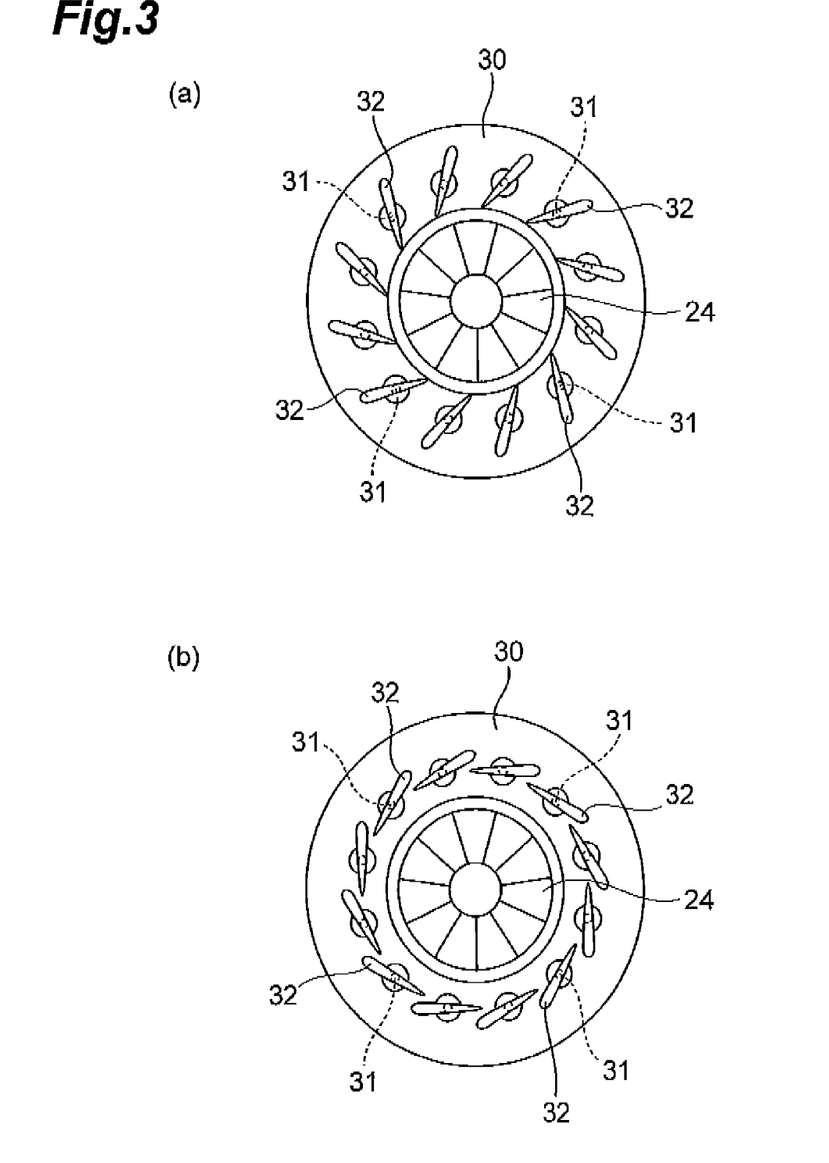
FIG. 3 is a drawing for explaining open and close states of variable nozzles in the variable geometry turbocharger shown in FIG. 2.

The turbine 22, as shown in FIGS. 2 and 3, has an annular nozzle plate 30 and a plurality of variable nozzles 32. The plurality of variable nozzles 32 are rotatably attached through respective nozzle shaft portions 31 to the nozzle plate 30. Each variable nozzle 32 adjusts a direction and a flow rate of exhaust gas flowing from the scroll passage 25a to the outlet passage 25b of the turbine housing 25. The variable nozzles 32 are arranged at equal intervals in the circumferential direction of the nozzle plate 30. Each nozzle shaft portion 31 is coupled through an unillustrated arm to a unison ring 33 and rotates in synchronism with rotation of the unison ring 33. The structure around the unison ring 33 including the nozzle shaft portions 31 is not detailed in particular herein, but it is the well-known structure, for example, as disclosed in Japanese Patent Application Laid-open No. 2009-180110.

The turbocharger 21 is further provided with a variable nozzle control device 34 (cf. FIG. 4) for controlling an opening of each variable nozzle 32. The variable nozzle control device 34 has a nozzle drive unit (nozzle drive means) 35 for driving each variable nozzle 32 through the associated nozzle shaft portion 31.

Figure 4:
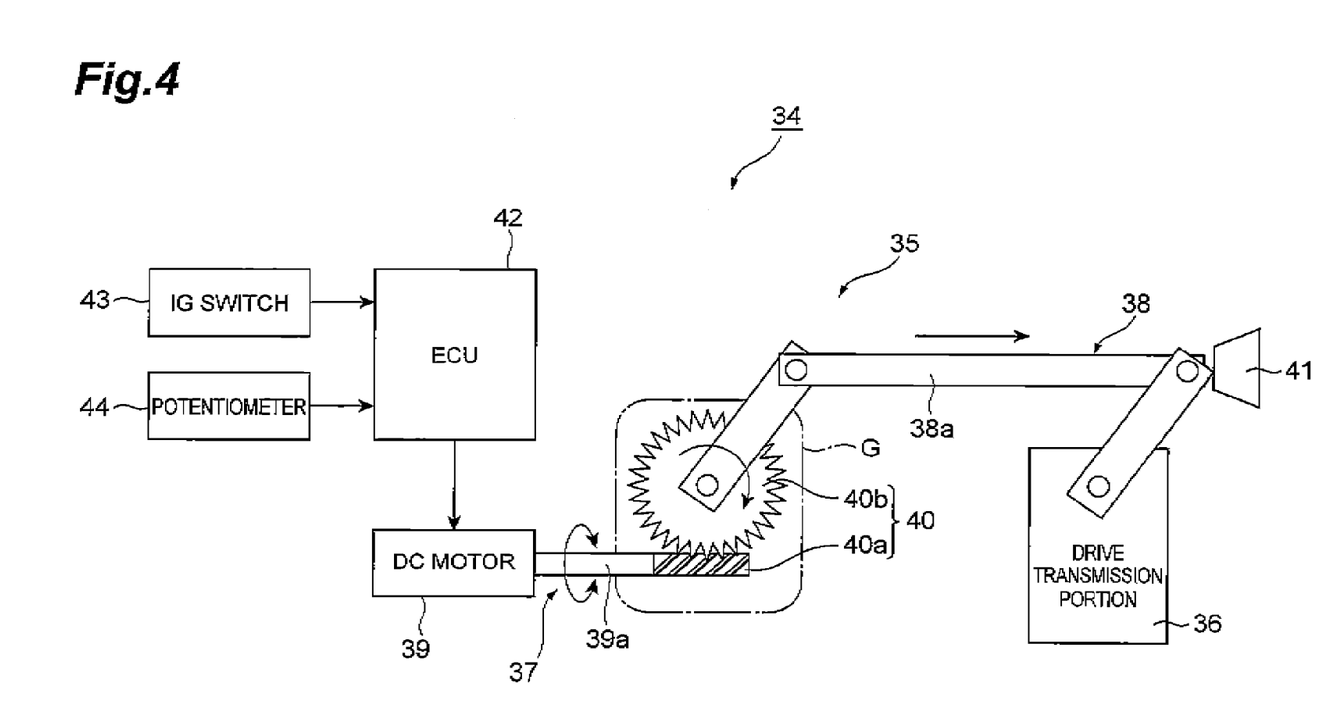
FIG. 4 is a configuration diagram showing a variable nozzle control device according to an embodiment of the present invention.

The nozzle drive unit 35 has the unison ring 33 and a drive transmission portion 36 coupled to the unison ring 33, as shown in FIG. 2. The nozzle drive unit 35, as shown in FIG. 4, has a drive source 37, and a four-bar parallel linkage 38 coupled to the drive transmission portion 36 and the drive source 37. The drive source 37 has a DC motor 39, and a worm gear 40 consisting of a worm 40a and a worm wheel 40b. The worm 40a is attached to an output shaft 39a of the DC motor 39. The worm wheel 40b is in mesh with the worm 40a. The worm gear 40 is lubricated with grease G. One end portion of the linkage 38 is coupled to the worm wheel 40b, and the other end portion of the linkage 38 to the drive transmission portion 36. The drive transmission portion 36 converts a drive force transmitted via the linkage 38, into a force to rotate the unison ring 33.

In the nozzle drive unit 35, rotation of the DC motor 39 results in rotation (tilt) of each variable nozzle 32 via the worm gear 40, linkage 38, drive transmission portion 36, unison ring 33, and each nozzle shaft portion 31. As the DC motor 39 is rotated in one direction at this time, the opening of each variable nozzle 32 becomes larger, as shown in FIG. 3(a), so as to increase the flow passage area between the variable nozzles 32 and decrease the flow rate of exhaust gas. On the other hand, as the DC motor 39 is rotated in the other direction, the opening of each variable nozzle 32 becomes smaller, as shown in FIG. 3(b), so as to decrease the flow passage area between the variable nozzles 32 and increase the flow rate of exhaust gas.

The variable nozzle control device 34 has a learning stopper 41 for learning of a reference position of the variable nozzles 32, as shown in FIG. 4. The learning stopper 41 is adjusted so as to be in contact with one end portion (the end portion on the drive transmission portion 36 side) of an intermediate link 38a of the linkage 38 when the variable nozzles 32 are in a full close state. A full close position of the variable nozzles 32 in learning is set at a position closed more than a full close position in an operating range of the variable nozzles 32 in operation.

The variable nozzle control device 34 has an electronic control unit (ECU) (controller) 42, as shown in FIG. 4. In the present embodiment, the ECU 42 functions as control means for controlling the nozzle drive unit 35. Connected to the ECU 42 are an ignition (IG) switch 43 for indications to start and stop the engine 1, and a potentiometer 44 for detection of the opening of the variable nozzles 32. The ECU 42 executes a normal control process to control the variable nozzles 32 in operation, and a variable nozzle full close learning process. In the variable nozzle full close learning process, learning using the full close state of the variable nozzles 32 as a reference position is carried out with the engine 1 at a stop.

Figure 5:
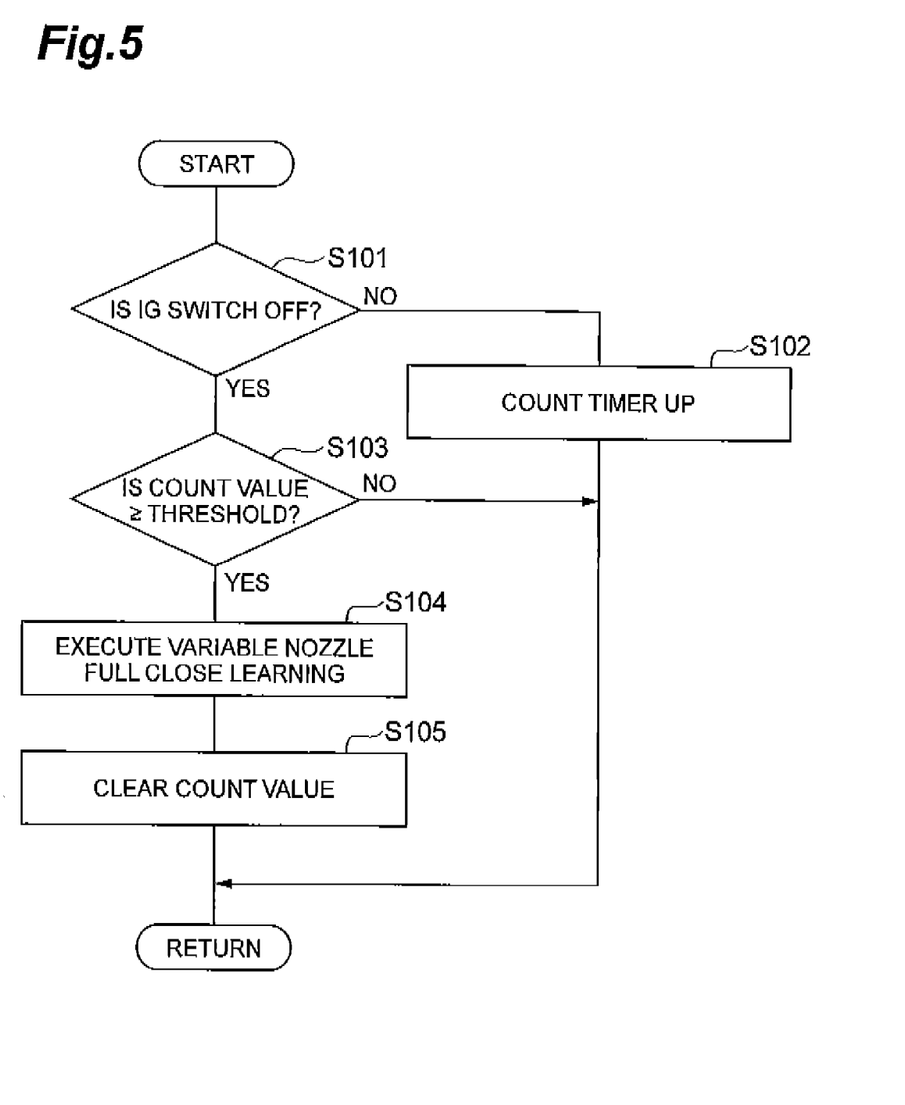
FIG. 5 is a flowchart showing a procedure of a variable nozzle full close learning process executed by an ECU shown in FIG. 4.

FIG. 5 is a flowchart showing a procedure of the variable nozzle full close learning process executed by the ECU 42. In this process, a count value of a timer built in the ECU 42 is preliminarily set to zero.

First, as shown in FIG. 5, the ECU 42 determines whether the IG switch 43 is in an OFF state, i.e., whether the engine 1 is at a stop (S101). When the ECU 42 determines that the IG switch 43 is in an ON state, it counts the built-in timer up (S102).

When the ECU 42 determines that the IG switch 43 is in the OFF state, it then determines whether the count value of the timer is not less than a predetermined threshold (S103). The threshold is calculated, for example, from the formula below. The parameters in the below formula are determined depending upon design conditions and others of the engine body 2 and the turbocharger 21.

$$\text{Threshold} = (\text{guarantee time of engine/guarantee count of contact with learning stopper}) \times \text{safety factor}$$

When the ECU 42 determines that the count value of the timer is less than the threshold, it returns to the process in S101. When the ECU 42 determines that the count value of the timer is not less than the threshold, it performs the variable nozzle full close learning (S104). Specifically, the ECU 42 controls the DC motor 39 so as to bring the one end portion of the intermediate link 38a of the linkage 38 into contact with the learning stopper 41. Then the ECU 42 clears the count value of the timer to zero (S105) and returns to the process in S101.

In the present embodiment, the variable nozzle full close learning is carried out when an ON time of the IG switch 43 after preceding execution of the variable nozzle full close learning, i.e., a substantial operating time of the engine 1 becomes not less than the threshold, with the IG switch 43 being in the OFF state. This variable nozzle full close learning brings each variable nozzle 32 into the full close state and the position of each variable nozzle 32 in this state is defined as a reference position. An opening detection value of the potentiometer 44 with the position of each variable nozzle 32 defined as the reference position is set as a reference value (e.g., 0), which can avoid dispersion of the opening detection value of the potentiometer 44.

In the above operation, the ECU 42 (particularly, the processes in S102 and S105) functions as means for counting a learning execution determination time including the operating time of the engine 1 after preceding contact of the nozzle drive unit 35 with the learning stopper 41. The ECU 42 (particularly, the process in S103) functions as means for determining whether the leaning execution determination time has reached the predetermined time. The ECU 42 (particularly, the process in S104) functions as means for controlling the nozzle drive unit 35 so as to bring the nozzle drive unit 35 into contact with the learning stopper 41 when the learning execution determination time has reached the predetermined time.

While driving an industrial vehicle (e.g., a forklift), a driver must always stop the engine 1 to leave its driver's seat and the driver frequently works off the driver's seat. For this reason, the industrial vehicles have the number of starts and stops of the engine 1 much larger than automobiles such as passenger cars. In loading and unloading works notable particularly for the forklift, the engine 1 is repeatedly started and stopped many times at intervals of less than five minutes. Therefore, if the variable nozzle full close learning is executed every stop of the engine 1, the number of times of contact of the linkage 38 with the learning stopper 41 must become large. If the variable nozzles 32 themselves deteriorate or if soot in the exhaust gas is deposited on the variable nozzles 32, the variable nozzles 32 will become less likely to move. This requires a larger drive force of the DC motor 39 in order to execute the variable nozzle full close learning.

Repetitions of contact of the linkage 38 with the learning stopper 41 will result in imposing a gradually increasing load on the worm gear 40 upon contact of the linkage 38. This will lead to deterioration of the grease G and the deterioration of the grease G may damage the worm gear 40. Furthermore, a large load will also be imposed on the linkage 38, which may cause abrasion of the contact portion of the linkage 38 and bearings, or, curvature and distortion of the linkage 38 itself. In addition, the increase of the load on the DC motor 39 can lead to generation of heat of the DC motor 39.

In contrast to it, the present embodiment is arranged not to perform the variable nozzle full close learning until the ON time of the IG switch 43 after the preceding execution of the variable nozzle full close learning becomes not less than the preset threshold, even with the engine 1 at a stop. This arrangement adequately decreases the frequency of contact of the linkage 38 with the learning stopper 41, whereby a significant load is unlikely to be applied to the worm gear 40, linkage 38, and DC motor 39 on occasions of contact of the linkage 38 with the learning stopper 41. For this reason, it becomes feasible to suppress the damage of the worm gear 40, the abrasion of the contact portion of the linkage 38 and the bearings, the curvature and distortion of the linkage 38 itself, and the generation of heat of the DC motor 39. As a consequence of this, it becomes feasible to improve the reliability of the turbocharger 21.

Figure 6:
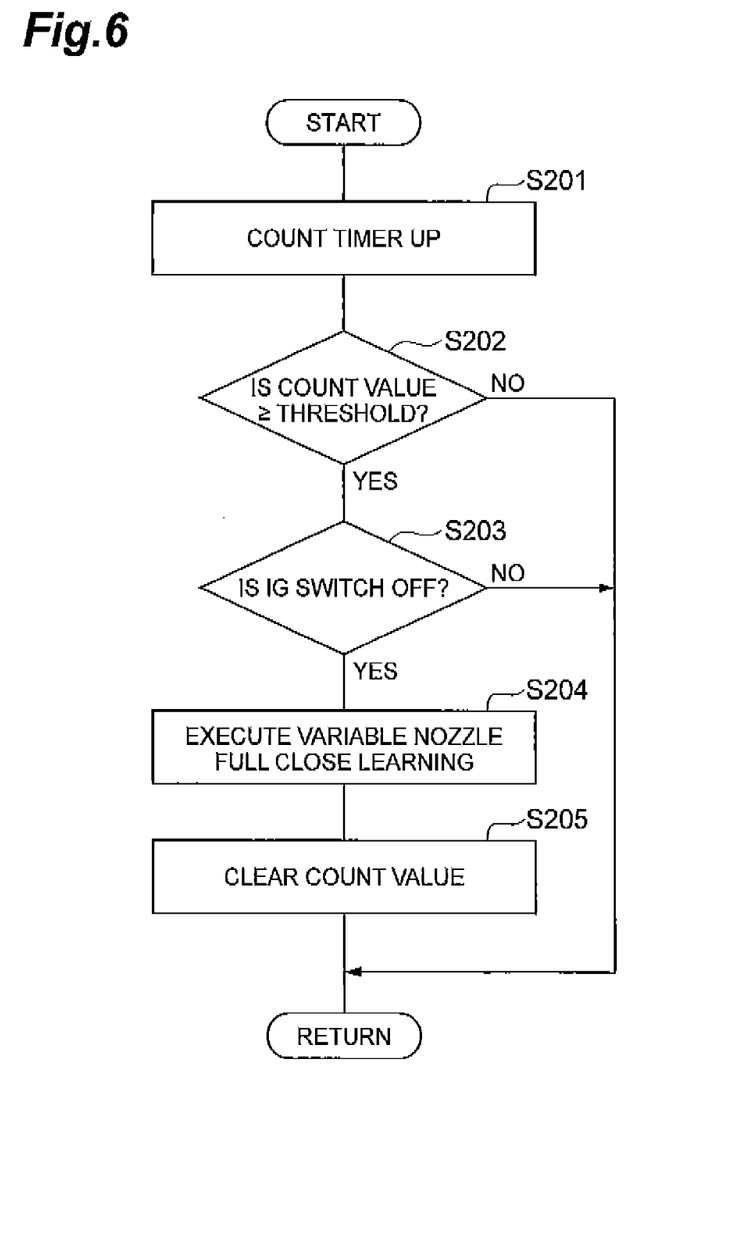
FIG. 6 is a flowchart showing a modification example of the procedure of the variable nozzle full close learning process.

FIG. 6 is a flowchart showing a modification example of the procedure of the variable nozzle full close learning process.

First, the ECU 42 counts the timer up (S201), as shown in FIG. 6. Subsequently, the ECU 42 determines whether the count value of the timer is not less than the aforementioned threshold (S202). When the ECU 42 determines that the count value of the timer is less than the threshold, it returns to the process in S201. When the ECU 42 determines that the count value of the timer is not less than the threshold, it determines whether the IG switch 43 is in the OFF state (S203). When the ECU 42 determines that the IG switch is in the ON state, it returns to the process in S201.

When the ECU 42 determines that the IG switch 43 is in the OFF state, it performs the variable nozzle full close learning (S204). Specifically, the ECU 42 controls the DC motor 39 so as to bring the one end portion of the intermediate link 38a of the linkage 38 into contact with the learning stopper 41. Then the ECU 42 clears the count value of the timer to zero (S205) and returns to the process in S201.

In the present modification example, the variable nozzle full close learning is carried out when the elapsed time after the preceding execution of the variable nozzle full close learning becomes not less than the threshold, with the IG switch 43 being in the OFF state. The elapsed time after the preceding execution of the variable nozzle full close learning is a total time of the ON time of the IG switch 43 corresponding to a substantial operating time of the engine 1 and the OFF time of the IG switch 43 corresponding to a stop time of the engine 1.

In the above operation, the ECU 42 (particularly, the processes in S201 and S205) functions as means for counting the learning execution determination time including the operating time of the engine 1 after preceding contact of the nozzle drive unit 35 with the learning stopper 41. The ECU 42 (particularly, the process in S202) functions as means for determining whether the leaning execution determination time has reached the predetermined time. The ECU 42 (particularly, the process in S204) functions as means for controlling the nozzle drive unit 35 so as to bring the nozzle drive unit 35 into contact with the learning stopper 41 when the learning execution determination time has reached the predetermined time.

The present modification example is arranged not to carry out the variable nozzle full close learning until the elapsed time after the preceding execution of the variable nozzle full close learning becomes not less than the preset threshold, even with the engine 1 at a stop. Therefore, this arrangement decreases the frequency of contact of the linkage 38 with the learning stopper 41. As a consequence of this, it becomes feasible to suppress the damage of the worm gear and the other troubles due to the contact of the linkage 38 with the learning stopper 41.

The present invention is by no means intended to be limited to the above embodiment. The embodiment of the present invention employs the configuration wherein the linkage 38 is brought into contact with the learning stopper 41, but the present invention does not have to be limited to this configuration. It is sufficient to bring only a part of the nozzle drive unit 35 into contact with the learning stopper 41. For example, it is possible to adopt a configuration wherein the unison ring 33 is brought into contact with the learning stopper. Specifically, the unison ring 33 is provided with a projection portion extending in a direction of its rotational axis and the learning stopper is arranged on the intermediate housing 29. In this case, the projection portion comes into contact with the learning stopper with rotation of the unison ring 33.

The present embodiment relates to the variable geometry turbocharger mounted on the diesel engine of the forklift, but the variable nozzle control device of the present invention is also applicable to the variable geometry turbochargers mounted on engines of the industrial vehicles other than the forklift (e.g., a tractor shovel) or the automobiles such as passenger cars. The industrial vehicles such as the forklift have the number of starts and stops of the engine much greater than the passenger cars. For this reason, if the variable nozzle full close learning is carried out every stop of the engine, the number of times of the variable nozzle full close learning may soon exceed a limit value (guarantee count for variable nozzle full close learning). Accordingly, the present invention is preferably applied to the industrial vehicles.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A variable nozzle control device for controlling an opening of a variable nozzle in a variable geometry turbocharger to be mounted on an engine, said variable nozzle control device comprising:
   nozzle drive means for driving the variable nozzle;
   a learning stopper for learning of a reference position of the variable nozzle, said learning stopper being configured to be in contact with the nozzle drive means with the variable nozzle being in a full close state; and
   control means configured to control the nozzle drive means so as to bring the nozzle drive means into contact with the learning stopper,
   wherein the control means has:
   first means for counting a learning execution determination time including an operating time of the engine after preceding contact of the nozzle drive means with the learning stopper;
   second means for determining whether the learning execution determination time has reached a predetermined time; and
   third means for controlling the nozzle drive means so as to bring the nozzle drive means into contact with the learning stopper when the second means determines that the learning execution determination time has reached the predetermined time, with the engine at a stop.

2. The variable nozzle control device according to claim 1, wherein the first means counts only the operating time of the engine after the preceding contact of the nozzle drive means with the learning stopper, as the learning execution determination time.

3. The variable nozzle control device according to claim 1, wherein the first means counts a total of the operating time and a stop time of the engine after the preceding contact of the nozzle drive means with the learning stopper, as the learning execution determination time.

4. A variable geometry turbocharger comprising:
the variable nozzle control device as defined in claim 1.

5. The variable geometry turbocharger according to claim 4,
said variable geometry turbocharger being mounted on an engine of an industrial vehicle.

6. A variable nozzle control device for controlling an opening of a variable nozzle in a variable geometry turbocharger to be mounted on an engine, said variable nozzle control device comprising:
a drive unit configured to drive the variable nozzle;
a stopper configured to be in contact with the drive unit with the variable nozzle being in a full close state; and
a controller configured to count a time including an operating time of the engine after preceding contact of the drive unit with the stopper, to determine whether the time counted has reached a predetermined time, and to bring the drive unit into contact with the stopper when determining that the time counted has reached the predetermined time, with the engine at a stop.

7. The variable nozzle control device according to claim 6, wherein the controller is configured to count only the operating time of the engine after the preceding contact of the drive unit with the stopper, as the time counted.

8. The variable nozzle control device according to claim 6, wherein the controller is configured to count a total of the operating time and a stop time of the engine after the preceding contact of the drive unit with the stopper, as the time counted.

9. A variable geometry turbocharger comprising:
the variable nozzle control device as defined in claim 6.

10. The variable geometry turbocharger according to claim 9,
said variable geometry turbocharger being mounted on an engine of an industrial vehicle.

* * * * *